United States Patent [19]

Martin et al.

[11] Patent Number: 4,892,658
[45] Date of Patent: Jan. 9, 1990

[54] WASTEWATER TREATMENT SYSTEM

[76] Inventors: Joseph P. Martin, 252 Sagamore Rd., Havertown, Pa. 19083; Kenneth J. Zitomer, 6340 N. 7th St., Philadelphia, Pa. 19126

[21] Appl. No.: 169,863

[22] Filed: Mar. 17, 1988

[51] Int. Cl.$^4$ ............................................. C02F 9/00
[52] U.S. Cl. .................................... 210/617; 210/630; 210/93; 210/151; 210/170; 210/202; 210/205; 210/253; 210/259; 210/614; 210/903
[58] Field of Search ............... 210/151, 614, 617, 618, 210/630, 903, 170, 205, 253, 259, 202, 203, 299, 93

[56] References Cited

U.S. PATENT DOCUMENTS

| | | | |
|---|---|---|---|
| 2,340,848 | 2/1944 | Reybold et al. | 210/151 |
| 2,388,795 | 11/1945 | Montgomery et al. | 210/151 |
| 3,709,364 | 1/1973 | Savage | 210/617 |
| 3,770,623 | 11/1973 | Seidel | 210/151 |
| 3,930,998 | 1/1976 | Knopp et al. | 210/630 |
| 3,957,632 | 5/1976 | Knopp et al. | 210/903 |
| 3,994,803 | 11/1976 | Neff et al. | 210/618 |
| 4,179,374 | 12/1979 | Savage et al. | 210/151 |
| 4,465,594 | 8/1984 | Laak | 210/151 |

FOREIGN PATENT DOCUMENTS

52-35457 3/1977 Japan .

OTHER PUBLICATIONS

EPA Design Manual for Onsite Wastewater Treatment and Disposal Systems, Chapter 4 and 6.6–6.8, U.S. EPA.

Cashell et al, Alternative Onsite Wastewater Treatment and Disposal Systems on Severely Limited Sites, U.S. EPA, 5/87.

*Primary Examiner*—Peter Hruskoci
*Assistant Examiner*—Christopher Upton
*Attorney, Agent, or Firm*—Robert Charles Beam

[57] ABSTRACT

A system for the environmentally-safe, unified treatment of a wastewater effluent is disclosed in which there is provided:

a primary treatment component comprising at least one means for the removal of solids, a secondary treatment component comprising at least one filtration field adapted for the secondary and advanced treatment of a wastewater effluent, and means to capture and convey effluent;

an advanced treatment component adapted to provide further advanced treatment of a wastewater effluent comprising
  at least one effluent accumulation means;
  at least one dosate storage and dosing means associated with each such effluent accumulation means; and
  at least one holding means capable of holding the dosed effluent in an anoxic condition;
  said advanced treatment component being adapted to accumulate, dose and hold the effluent for treatment in an anoxic condition; and a polishing component comprising at least one infiltration field to discharge effluent.

16 Claims, 2 Drawing Sheets

4,892,658

WASTEWATER TREATMENT SYSTEM

FIELD OF THE INVENTION

The present invention relates to a system for the environmentally-safe, unified treatment of a wastewater effluent.

BACKGROUND OF THE INVENTION

In areas without public sewers, local and regional zoning laws typically limit building to sites where a standard septic system, i.e. a septic tank and leaching or disposal field, can be installed. In such areas, the subsoil conditions provide adequate percolation to treat wastewater.

Standard systems, however, are not intended to substantially remove nitrogen in the form of ammonia or nitrates, which typically enter the groundwater with the effluent.

Frequently, even where the geologic conditions might allow the use of standard septic systems, increasingly stringent regulatory standards require the removal of nitrogen from the wastewater.

Where standard systems cannot be employed, because of subsoil conditions, minimal lot size or regulatory restrictions, innovative on-site waste disposal systems have been used.

One type of on-site system involves waterless toilets which either compost or incinerate wastes. Since standard septic treatment systems are still required for the treatment of other household wastes ("graywater"), such systems typically mean additional costs to the landowner, as well as increased maintenance.

Another on-site system involves intermittent, pressurized dosing of standard septic tank effluent to the septic field. While the effluent from such systems have been shown to have reduced nitrates, it is difficult to determine the effectiveness of such treatment in a field installation where it is inconvenient or impossible to measure the nitrate level in the effluent.

Another on-site system is commonly referred to as the "Ruck" system. Wastewater from the toilet, or "blackwater", is initially separated from the graywater from showers, sinks, and washing machines. The blackwater is filtered through a sand bed. After a solids settling tank, the graywater is combined with the filtered blackwater and directed into a tank filled with rocks. Bacteria on the surface of the rocks convert the nitrates in the combined effluent into nitrogen gas which is vented. The effluent then flows into a standard septic field where it percolates into the ground.

One problem typically encountered with such a system however, is that it is not always certain that the combined wastewater will provide the proper balance of components necessary to allow complete bacterial conversion of nitrogenous material to ventable gas.

OBJECTS OF THE PRESENT INVENTION

It is an object of the present invention to provide an on-site septic system without the cost and inconvenience of waterless toilets.

It is a further object of the present invention to provide an on-site wastewater treatment and disposal system which will better assure the removal of nitrates.

It is a still further object of the present invention to provide an on-site wastewater treatment and disposal system which does not require the separate handling of "black" and "gray" waste water streams.

The other objects, features and advantages of the present invention will become more apparent in light of the following detailed description of the preferred embodiment thereof.

According to one embodiment of the present invention, there is provided a system for the environmentally-safe, unified treatment of a wastewater effluent, said system comprising: a primary treatment component comprising at least one means for the removal of solids; a secondary treatment component comprising at least one filtration field adapted for the secondary and advanced treatment of a wastewater effluent, and means to capture and convey effluent; an advanced treatment component adapted to provide further advanced treatment of a wastewater effluent comprising at least one effluent accumulation means; at least one dosate storage means associated with each such effluent accumulation means; and at least one holding means capable of holding the dosed effluent in an anoxic condition; said advanced treatment component being adapted to accumulate, dose and hold the effluent for treatment in an anoxic condition; and a polishing component comprising at least one infiltration field to discharge said effluent.

According to another embodiment of the present invention, there is provided a process for the environmentally-safe, unified treatment of a wastewater effluent, said process comprising
  primary treatment including sedimentation of an effluent to substantially remove suspended solids, and clarify the effluent;
  secondary and advanced treatment including filtration of the clarified effluent to oxidize organic material and nitrify the effluent;
  capture and conveyance of the nitrified effluent to an advanced treatment zone wherein the nitrified effluent is accumulated and dosed with a controlled carbon source and held in an anoxic condition to de-nitrify the effluent; and
  filtration and discharge of the effluent.

DETAILED DESCRIPTION OF THE INVENTION

Figure 1:
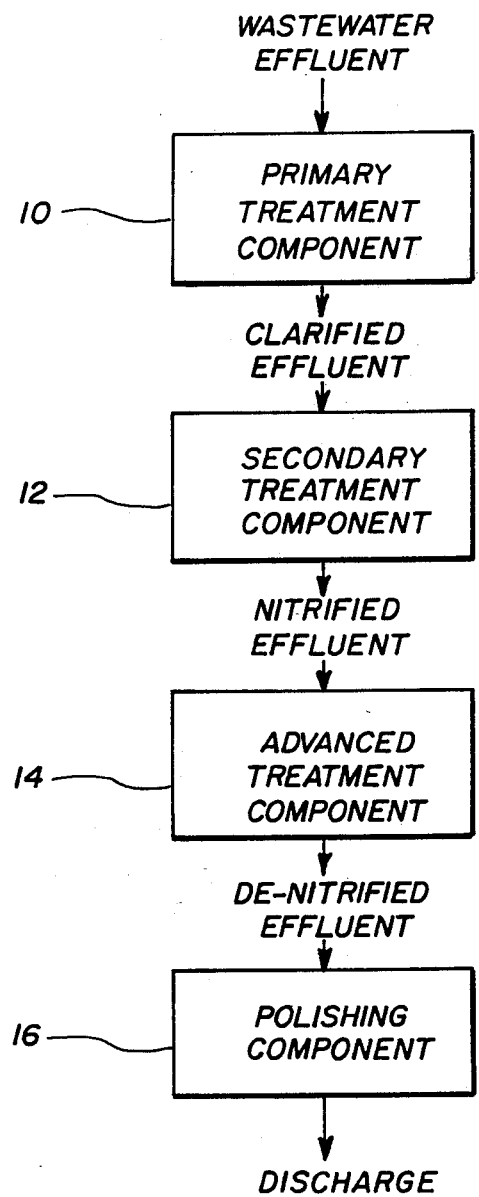
FIG. 1 shows a flow chart of a simplified embodiment of the present invention.

In FIG. 1, there is shown a flow diagram of what is believed to be the simplest embodiment of the present invention. It will be seen that the present invention employs well-known unit operations in a novel assembly.

With reference to FIG. 1, a wastewater effluent stream is brought into the system by way of the solids settling tank of a primary treatment component (10) such as the septic tank of a standard septic treatment system. The clarified effluent is then directed into a secondary treatment component comprising a filtration field (12), similar to a standard septic field or mound, except that the field or mound is well aerated, comprised of particulate media of a defined range of gradations and adapted for the capture and collection of the nitrified effluent.

This nitrified effluent is then treated in an advanced treatment component (14) comprising a denitrification tank to denitrify the effluent. This is done by dosing the effluent with a carbon source, such as methanol, and holding the effluent in an anoxic condition (with little or no oxygen) for a sufficient time before final filtration. The effluent treated in this manner is then directed into a polishing component (16) which is a standard septic field or mound in which the filtered effluent is eventually discharged into the groundwater.

While substantially more complicated embodiments of this system are possible, and even probable to meet the particular needs of a situation, flow according to the diagram of FIG. 1 will still be followed.

The present invention has resulted from a plan for the treatment and disposal of domestic wastewater generated by the expansion of a shopping circuit. The design flow rate for this expansion was 11,250 gallons per day. Because of the stringent groundwater quality standard set, ten milligrams per liter, the system was modified to include the installation of a denitrification facility within the onsite wastewater disposal facility.

The original plan was thus modified to consist of:

(1) Dual sets of septic tanks, with a 3000 gallon and a 2000 gallon tank in each series, for the purpose of flow equalization and settleable and floatable solids removal.

(2) Pump pit with wetwell and duplex pumps to apply clarified wastewater in controlled doses.

(3) Duplex aerobic fields containing four 2800 square foot sand filters to remove biological oxygen demand and nitrify wastewater.

(4) Liner and underdrain for each aerobic field to capture and convey nitrified effluent.

(5) Second wetwell and duplex pump, and fire-protected methanol storage tank and pump to accumulate and dose nitrified effluent with a controlled carbon source.

(6) Duplex 3000 gallon, stone-filled anoxic tanks to denitrify waste water in a batch, upflow mode.

(7) Disposal field with duplex 5500 square foot infiltration beds to discharge effluent and adsorb or filter residual bacteria.

WASTEWATER GENERATION

The 11,250 gallon per day design flow originated from roughly 90,000 square feet of retail space, computed at the standard generation rate of 0.125 gallons per day per square foot. Roughly half of this tributary area is a supermarket, with the balance of the flow coming from smaller stores distributed between several buildings grouped around the front parking area. Flow from this secondary area is conveyed to the wastewater disposal facility through a force main after comminution in a grinder pump. Discharge from both areas is blended in a manhole at the head of the treatment system.

Because this shopping center is in a resort area, two distinct markets are served by the center: permanent, year-round residents and a large number of seasonal transients and summer residents. Consequently, severe fluctuations in both flow rate and wastewater constituents have to be anticipated over the year. Peak wastewater flows should be encountered on summer weekends, with a secondary peak occurring in December. All biological treatment elements were designed in parallel units. Periodic system maintenance, in the form of rejuvenation of the sand filter, anoxic tank, and the infiltration field can therefore be done in the low-flow periods in mid-fall and winter-early spring.

PRIMARY SEDIMENTATION

The plan called for two sets of tanks in series; the first in each being a 3,000 gallon tank, and the second being a 2,000 gallon tank for a total of 10,000 gallons of settling volume. This exceeds the standard required volume computed by the formula for flows in excess of 2,000 gallons per day:

Volume=2,250+0.375$Q$ (6,500 gallons for $Q$=11,250 gpd)

The first tank in each set was intended to dampen daily flow variations and provide coarse sedimentation. The second tank then provided more quiescent conditions to optimize suspended solids separation. The nominal dimensions for the larger tanks are six feet wide, twelve feet long, and five feet eight inches deep, with the secondary tanks eight feet long and the same depth and width.

Dual six inch inlet and outlet tees conveyed water into, between and out of the tanks to minimize solids re-suspension. Very good primary sedimentation is indicated by the following values at the conservatively calculated design flow rate:

| | |
|---|---|
| Overflow rate, first tank | 63 gallons per day per square foot |
| Overflow rate, combined | 38 gallons per day per square foot |
| Detention time, first tank | 12.8 hours |
| Detention time, combined | 21.3 hours |
| Through velocity | $2.5 \times 10^{-4}$ feet per second |
| Exit velocity | $2.2 \times 10^{-3}$ feet per second |

On the basis of these values, it was anticipated that the results for efficiently designed tanks cited in *Wastewater Collection and Treatment*, Metcalf & Eddy (McGraw-Hill 1980) would apply in this case, i.e., up to 70% of the suspended solids and 25% to 40% of the Biological Oxygen Demand. There will, of course, be no removal of nitrogen in the form of ammonia, but 10% to 20% of the nitrogen in organic forms can be removed. This sums to a minor portion of the total nitrogen, but does allow a value of 40 milligrams per liter in the tank effluent to be used with confidence.

PRIMARY EFFLUENT PUMPING AND DISTRIBUTION

To assure uniform distribution of effluent and to force organic material to be absorbed in the biofilm several inches into the bed surface, it is desirable to flood the surface of the sand filter beds at each dosage. To provide about one inch ponding in the stone distribution beds overlying the 11,200 square foot of sand filter surface, 2000 gallons of clarified wastewater should be derived at each dose. In the present system this is done with a duplex ½ horsepower pump (Goulds Model 3835), set in an eight foot diameter wetwell pit with further storage in the manhole to which the septic tanks overflow. A drawdown of about three feet in the storage will occur in each dosage, taking about thirty minutes at design flow rates when substantial septic tank overflow occurs during pumping, and somewhat longer in low-flow periods. The design flow of 11,250 gallons per day will be delievered to the filter beds in about six doses per day.

The keys to efficient and long-term operation of the sand filters are uniform distribution, rapid re-aeration and the ability to valve off portions during low wastewater generation periods to drain and unclog the filters. Clarified wastewater is pumped through a one and one-half inch pressure line to a valve pit for division between pairs of 2800 square foot sand filters. The bifurcated lines discharge into distribution boxes set in the center of each pair of filters. Wastewater then flows through six inch manifolds to the four inch perforated laterals for uniform distribution into the stone bed overlying the filters.

Aeration is provided by a rotating ventilator on the distribution box and riser vents at the end of the manifolds. A continuous stone-filled five foot wide vent trench provides direct contact between the distribution bed and the atmosphere along the spine of each pair of filters. Re-aeration through the topsoil cover is also assisted by the projection of the filter mound above the local grade. This also minimized surface compaction by traffic.

During low flow periods, when one bed is valved off to rejuvenate by endogenous respiration of excess biomass and decomposition of other organic material, the minimum of two dosages per day on active filter beds, as recommended by the U.S. Environmental Protection Agency, is assured.

SAND FILTERS

The filters must be pervious yet provide sufficient surface area for an attached biofilm to both degrade organics and nitrify the effluent. As noted in Strand (Journal of Env. Eng., ASCE, Vol 112, No. 4, 1986), carbon (organic) oxidation occurs at the influent end of rotating biological contractors and trickling filters. Ammonia oxidation occurs primarily toward the effluent end when the biological oxygen demand has decreased to less than twenty-five milligrams per liter. Thick film models also illustrate the potential for nitrification and possibly, denitrification at the influent end. In either case, a sequence in both time (detention and velocity) and space (filter depth) of degradation of organic matter followed by nitrification is desired.

The filters employed in the present embodiment are thirty-six inches deep, consisting of native soil, excavated from the field "footprint" in order to place the liner and underdrain, as described hereinafter. Onsite exploration had previously shown that the near-surface soils in this area were medium sand with gravel lenses. The composite twenty four inch to thirty six inch sample from borings has an effective size ($d_{10}$) of 0.24 millimeters, a uniformity coefficient ($C_U$) of 3.8 and was classified as SP by the Unified System. These results were compatible with the descriptions of the lower zones of the Sassafras Series, identified on the USDA Soil Survey as being the likely pre-mining formation. Reference to the *Design Manual for Onsite Wastewater Treatment and Disposal Systems*, Municipal Environmental Research Laboratory, United States Environmental Protection Agency, October 1980, indicated the probability that this material would be successful in a sand filter operating at 1.0 gallons per day per square foot. This probability is enhanced by the uniform clarified water distribution and the opportunity for annual or semi-annual rejuvenation. In other situations, the required filter sand could be readily obtained commercially.

The native soil was mixed and washed as necessary before redeposition as a sand filter. A well-compacted (to about 75% relative density) laboratory sample of the composite from borings showed a constant-head permeability of $7.0 \times 10^{-3}$ centimeter per second, or 9.8 inches per hour. This was compatible with the percolation rate described in the Soil Survey for the lower Sassafras.

The desired reactions require oxygen replenishment and intimate contact between the biomass and the percolating effluent. Both goals are served by a low operating degree of saturation. A single dose, flooding about one inch in a stone bed with a porosity of between 0.3 and 0.4, will penetrate as a highly saturated wetting front only a few inches into the filter surface with a well-developed attached biomass. For the bulk of the filter depth, a steady flow approximation is reasonable, i.e. the gradient in Darcy's law is one (gravity). Therefore, the velocity, v, equals the effective conductivity, $K_e$.

A one gallon per day per square foot operation will allow very low saturation in steady flow below the surficial clogging layer, as shown by an analysis using the Brooks-Corey technique for estimating unsaturated permeability. The effective conductivity is related to the saturated conductivity as follows:

$$K_e = K_{sat} S_e^B$$

where:
$K_{sat}$ is the saturated permeability or conductivity;
$S_e$ is the effective saturation (total liquid saturation corrected for residual saturation); and
B is an empirical function of the pore-size distribution index.

Typical values of specific retention (0.05), porosity (0.35), pore size distribution index (lambda=0.55), residual saturation (15%) and displacement pressure head (six inches) for fine to medium sand were taken from Bloomsburg (Proc. of the NWWA Conference on Characterization and Monitoring of the Vadose Zone, Denver, Co., November 1986). These values were used in the analysis with an effective conductivity of one gallon per day per square foot. The result is that a discharge velocity of 0.13 feet per day requires an effective saturation of 25%, which corresponds to a total pore saturation of about 35%. Both air flow and intimate contact between the biomass and percolate are assured at this value (Martin and Parkin, "Land Treatment of Tannery Wastes", Journal of American Leather Chemists Association, 1986). Of course, this estimate with assumed numbers does not account for substantial biomass occupancy of pore space, but in the lower portions of the filter, where nitrification is expected, the biofilm would be expected to be thin. The degree of saturation at design flow can be expected to be in the range of 50%, and lower at normal and low flow rates.

At a discharge velocity of 0.13 feet per day, porosity of 0.35 and degre of saturation about 50%, the seepage velocity would be on the order of about 0.75 feet per day. This yields a travel or detention time in the thirty six inch deep filter of about four days at the design flow rate. There is no reason not to expect very good conversion of nitrogen in organic compounds and ammonia to nitrate.

NITRIFIED EFFLUENT COLLECTION

After passing through the sand filters, the nitrified effluent drips onto a peastone blanket drain, is intercepted by a flexible membrane liner, and diverted to a six inch slotted underdrain. The filter and underlying blanket drain is separated by a geotextile to prevent loss of sand. The design flow of 11,250 gallons per day can easily be captured and conveyed by 200 feet of six inch pipe with one-eighth inch slots placed at one inch intervals. Interception with slots rather than perforations is advisable in case some biofilm forms. A ventilator is installed at the upstream end of the underdrain.

The liner is a 20 mil PVC geomembrane. This is the standard material and thickness used by the U.S. Dept. of the Interior, Bureau of Reclamation to line canals to minimize leakage and promote salinity control. While seepage of effluent to the groundwater should be prevented at this stage, it must be noted that the sand filter effluent is not landfill leachate. The elaborate features required for lining landfills are not necessary here. The liner is not intended to impound liquid, but, rather, to divert it to the underdrain.

BATCH DENITRIFICATION

Denitrification occurs in an anoxic fixed-film bed with the addition of methanol as the carbon source for bacterial growth. Several equivalents were considered which might be more appropriate in other situations, including injection into the peastone blanket drain under the sand filter and other buried anoxic filter approaches. Problems in controlling the methanol feed, as excess methanol would contribute to biological oxygen demand, and poor dispersion in the effluent, rendered such approaches less desirable for the present embodiment. Moreover, easy access to the dentrification facility for media replacement and the like, is preferred. Therefore, the batch denitrification technique described in the previously cited EPA Manual was adopted. The basic concept is to premix a methanol solution with incoming nitrified effluent, and pump it into a coarse media tank in a batch, upflow mode.

Effluent from the underdrain described in the previous section is conveyed in a six inch PVC pipe to accumulate in the wetwell of the pump pit, where it mixes with a premeasured amount of methanol. At the accumulation of approximately 940 gallons in the eight foot diameter wetwell, the effluent-methanol mixture is injected into the bottom of one of the two 3000 gallon concrete tanks filled with coarse (one and one half inch) stone media covered with biofilm. The denitrified effluent liquid previously detained in the tank is then displaced to the infiltration field.

Methanol is stored in a 500 gallon tank containing a 30% methanol-water solution (approximately 80 proof) to improve fire safety. The tank is placed in a covered, three-wall masonry shed with the open end away from public view. Although the design shown in the previously cited EPA Manual employs the time release of methanol, this was not believed to be suitable for the needs of the present system. While daily variations in flow will be considerably dampened as wastewater passes through the preceding steps in the present embodiment, there is a particular danger of over or underfeed with a time release mode in the present system because of the expected seasonal peaks. Therefore, the methanol is fed to the wetwell with a positive displacement pump, activated at the end of each cycle of effluent pumping into the tanks. This assures complete mixing with the incoming nitrified wastewater as it accumulates.

The two 3000 gallon anoxic tanks have an effective void volume between 1000 and 1100 gallons with the stone media used. This yields a detention time of slightly under five hours at the peak design flow rate, and of course, longer detention at lower rates. While the efficaciousness of this form of batch denitrification is well established, (see, in this regard "Management of Small Waste Flows", Univ. of Wisconsin-U.S. EPA, 1978) the sensitivity of denitrification efficiency to detention time is not well established.

Should longer detention times be necessary, the stone can be replaced with plastic media to increase porosity. However, for the present system, stone media was favored for economy as it can simply be replaced should biofilm clogging occur. This problem is reduced by careful methanol control and sufficient upflow velocity to mobilize loose, excess biofilm. The same type of ½ horsepower pumps described earlier for feeding the sand filters should provide a pumping rate in each cycle of about 60 gallons per minute, which is divided equally between the two tanks in normal operation. With each tank nominally six foot by twelve foot in plan, and an assumed porosity of about 0.35, the upflow seepage velocity at each batch cycle would be about $3 \times 10^{-3}$ feet per second.

At each batch pumping, roughly 470 gallons of dosed effluent are injected into the bottom of each tank through two perforated one and one-half inch pipes. This is about 40% of the liquid volume of the tank, such that short-circuiting of the fresh methanol-nitrified effluent mixture will be minimized. Overflow to the infiltration field is through a six inch perforated pipe along the axis of the tank. A two inch vent stack is placed in each tank to allow release of methane and nitrogen as produced.

As with all other biological treatment units in the present system, there is a provision for valving off each anoxic tank for biomass reduction, drainage, and replacement of media as necessary. During this period, the dosage applied to the active tank (controlled with mercury float switches) will be reduced to about 500 gallons/bath to prevent short-circuiting. At the end of each such rejuvenation, liquid from the active tank can be fed into to the fallow tank to reseed the media to accelerate restoration to full service.

METHANOL FEED RATE

The working assumption is that essentially all nitrogen forms are nitrified by the time the effluent reaches the anoxic tanks, but no nitrogen has been removed from the system although several opportunities exist for this to happen to a small degree. Consequently, the basis for design of the methanol feed is an influent to the pump pit of forty milligrams per liter. The EPA manual recommends supply of a carbon source in the ratio C:N=3:1. Using the respective molecular weights, this translates to $CH_3OH$:N ratio of 8:1, requiring 1216 milligrams of methanol per gallon of wastewater with forty milligrams per liter of nitrate (as N). With a standard nitrified effluent batch of 940 gallons and a design flow of 11,250 gallons per day, the required methanol feed rates from the EPA rule-of-thumb are:

0.8 gallons of pure methanol/batch
4.6 gallons per day

With methanol stored in a 30% water solution these values convert to:

2.7 gallons of solution/batch
15.3 gallons per day

If insufficient methanol is supplied, the biomass synthesis will be a limiting factor in denitrification, but if excess methanol is applied, the effluent from the anoxic tanks will have a biological oxygen demand which must be reduced in the infiltration fields. This is taken into account in the following section. With permit requirements for monitoring wastewater quality at points within the system, better control of methanol can be done (Metcalf & Eddy, 1980). For example, if substantial oxygen is present, some methanol is required to deplete it. Full nitrification might not be achieved, such that nitrate could be present. The following empirical equation was obtained by McCarty, et al., Biological Denitrification of Wastewaters by Addition of Organic Materials, Proc 24th Purdue Indus. Waste Conf., 1969) based on stochiometric energy/synthesis balances:

$$CH_3OH \text{ req'd} = 2.47 \text{ nitrate} + 1.53 \text{ nitrite} + 0.87 \text{ oxygen}$$

More sophisticated analysis requires knowledge of the solids retention time, which cannot be computed with any degree of confidence. For initial planning, therefore, the design feed rate was as noted above, and would be monitored and corrected after field data is obtained. A 500 gallon methanol solution tank and displacement pump capable of delivering three gallons/batch were provided.

It should be apparent to one skilled in the art that the present system, while it is intended to provide a separate stage for the denitrification of effluent is adaptable to other forms of advanced treatment. It should be apparent in this regard therefore, that the present system permits access to the effluent in mid-process, which will permit among other benefits, ease in monitoring the effectiveness of treatment. Further, the system can easily be modified to permit different advanced treatment, i.e., treatment of an effluent component other than nitrogen, to the exclusion of the treatment of nitrogen, or simultaneously or sequentially therewith, as such treatment may become necessary for a given wastewater composition, geological situation or regulatory necessity.

INFILTRATION BEDS

At the end of what amounts to a flexible, in-ground advanced biological treatment facility, it is not only necessary to discharge the effluent to groundwater, but absorb bacteria and viruses, and perhaps, intermittently complete denitrification in high flow periods. For these reasons, the infiltration beds have finer soils than the previously described sand filters: i.e., silty onsite soil. Further, the effluent is applied more traditionally, to the side rather than uniformly from the center of the bed as previously described for the sand filters.

The distribution piping in the twin infiltration beds is laid out in a "comb" pattern. Each batch of effluent displaced from the denitrification tanks passes through a distribution box into two manifolds, and thence between perforated laterals and to the stone bed. A small flood wave of liquid depleted of oxygen will thus pass over the infiltration surface, temporarily inducing anoxic conditions to complete denitrification if necessary. While none of the organics orginally present in the wastewater are expected to be discharged onto the infiltration surface, some biofilm will develop to degrade excess solids washed out of the anoxic tanks. This is not intended to be a pressure dosing system however, and at more normal flows, the cycle of application and drainage will be less dramatic.

The infiltrative surface is three feet above the local ground surface. Borings under or beside the infiltration bed, show seasonal high water levels at fifty one inches and sixty inches below natural grade, respectively. The soil is highly stratified, including gravely and fine sand layers. This condition is not amenable to groundwater mounding analysis based on isotropic, homogeneous soils, but clearance of the seasonal high water level even with the mound formed by infiltration can be expected.

The design infiltration rate for the effluent which only requires "polishing" before entry into groundwater is one gallon per day per square foot. The fill for the infiltration mound is proposed to be onsite "topsoil", actually the weathered surficial material from a borrow pit apparently stripped several decades ago.

This soil was described as follows: ($d_{10}=0.05$ mm), 11% fines, uniformly coefficient=8.3, and a classification as SP-SM. Constant-head permeability tests showed a saturated conductivity of $6.3 \times 10^{-4}$ centimeters per second, or 0.9 inches per minute.

The Brooks-Corey relationship and data from the Bloomsburg paper described earlier can be used to estimate the prevailing degree of saturation below the infiltrative surface. Using values for "loamy sand", at an effective conductivity (discharge velocity) of 0.13 feet per day, a steady-state degree of saturation of about 35% is required to convey the flow. Again, this does not account for active biofilm and decaying organic matter, but natural aeration and absorption opportunities are expected. With the lower oxygen demand than in the sand filters, artificial ventilation is not believed to be necessary.

Figure 2:
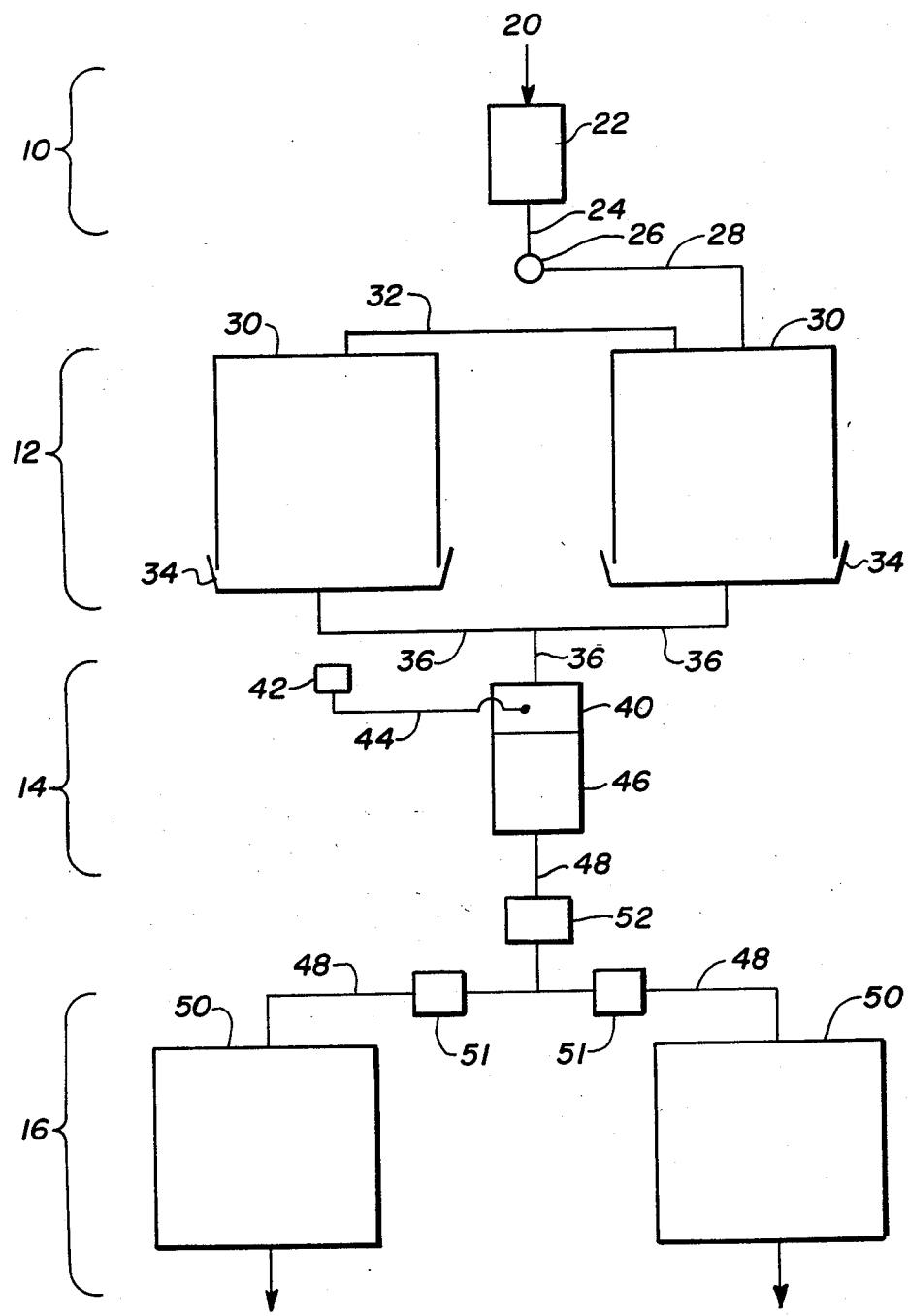
FIG. 2 shows a block diagram of a larger capacity embodiment of the present invention.

This system is shown in the process diagram of FIG. 2. It will be seen that the system still shows the basic elements of FIG. 1., but the system shown in this embodiment is adapted to meet the needs of a larger, redundant system. Thus, the primary treatment component shown at (10) includes any number of settling tanks (22) into which untreated effluent is directed by pipeline (20) and from which clarified effluent is conveyed by pipeline (24). Conveyance of this effluent may be facilitated by a pump (26), then continued through pipeline (28) into the next element, or secondary treatment component (12).

As can be seen in FIG. 2, the secondary treatment component (12) contains redundant filtration fields (30) interconnected by pipeline (32). These filtration fields (30) are each provided with means to capture the effluent, shown as (34), and convey the effluent, via redundant pipelines (36).

The effluent from the secondary treatment component (12) is conveyed into an advanced treatment component (14). This component comprises at least one effluent accumulation tank (40), where a measured quantity of a controlled carbon source, typically methanol, is provided from dosate storage means (42) through pipeline (44) to dose the accumulate effluent in accumulation tank (40). The dosed effluent is then transferred and held in an anoxic condition in holding tank (46) to permit bacterial denitrification of the effluent, before leaving the collection and secondary treatment component (14) by pipeline (48).

Pipeline (48), which may be redundant, carries the de-nitrified effluent to a polishing component (16) where one or more infiltration fields (50) filter and discharge the treated effluent.

Means (51) to disconnect either infiltration field from the system for service, regeneration, or replacement may be provided in the pipeline (48).

In addition to the redundant filtration fields (30) and the redundant infiltration fields (50) shown, the primary treatment component (10), the accumulation tank (40) and the holding tank (46), may include a number of interconnected units with means to disconnect any such unit from the system for service, regeneration, or replacement. Means (52) to monitor the effluent of the advanced treatment component (14) may also be provided.

It will be evident that the terms and expressions that have been employed herein are used as terms of description and not of limitation. There is no intention in the use of such terms and expressions of excluding equivalents of the features shown and described or portions thereof, and it is recognized that various modifications are possible within the scope of the invention claimed.

What is claimed is:

1. A system for the environmentally-safe, unified treatment of a wastewater effluent, said system comprising:
    a primary treatment component comprising at least one means for the removal of solids from said wastewater effluent to provide a clarified effluent substantially free of solids;
    a secondary treatment component comprising at least one filtration field for the secondary treatment of the clarified effluent stream from the primary treatment component to provide a nitrified effluent, and means to capture and convey said nitrified effluent;
    a batch type advanced treatment component to provide advanced treatment of a nitrified effluent comprising:
        at least one effluent accumulation means;
        at least one dosate storage and dosing means associated with each such effluent accumulation means; and
        at least one holding means capable of holding a dosed nitrified effluent in an anoxic condition,
    wherein said advanced treatment component can accumulate, dose and hold the nitrified effluent for treatment in an anoxic condition to provide a de-nitrified effluent; and
    a polishing filtration component comprising at least one infiltration field to filter the de-nitrified effluent to provide a treated effluent and discharge said treated effluent.

2. The system of claim 1, wherein the secondary treatment component comprises both a biological and physical filter.

3. The system of claim 1, wherein the advanced treatment component further comprises means to monitor the effluent.

4. The system of claim 1, wherein the advanced treatment component further comprises means to treat other impurities in the effluent.

5. The system of claim 1, wherein the primary treatment component comprises a plurality of interconnected means for the removal of solids, such that any such means may be disconnected from the system for service, regeneration or replacement.

6. The system of claim 1, wherein the secondary treatment component comprises a plurality of interconnected filter fields, such that any such filter field may be disconnected from the system for service, regeneration or replacement.

7. The system of claim 1, wherein the advanced treatment component comprises a plurality of interconnected accmulation means, such that any such accumulation means may be disconnected from the system for service, regeneration or replacement.

8. The system of claim 1, wherein the advanced treatment component comprises a plurality of interconnected holding means, such that any such holding means may be disconnected from the system for service, regeneration or replacement.

9. The system of claim 1, wherein the polishing component comprises a plurality of interconnected infiltration fields, such that any such infiltration field may be disconnected from the system for service, regeneration or replacement.

10. The system of claim 1, wherein the advanced treatment component further comprises means for the additional advanced treatment of the effluent.

11. The system of claim 10 wherein the means for the additional advanced treatment of the nitrified effluent is intended to function simultaneously with the accumulation, dosing and holding means of said advanced treatment component.

12. The system of claim 10 wherein the means for the additional advanced treatment of the nitrified effluent is intended to function sequentially with the accumulation, dosing and holding means of said advanced treatment component.

13. A process for the environmentally-safe, unified treatment of a wastewater effluent, said process comprising:
    primary treatment including sedimentation of a wastewater effluent to substantially remove suspended solids, providing a clarified effluent;
    secondary treatment including filtration of the clarified effluent through a filtration field to oxidize organic materials and provide a nitrified effluent;
    capture and conveyance of the nitrified effluent to a batch type advanced treatment zone wherein the nitrified effluent is accumulated and dosed with a controlled carbon source and held in an anoxic condition to provide a de-nitrified effluent; and
    filtration of the de-nitrified effluent through an infiltration field to provide a treated effluent and discharge of the treated effluent.

14. The process of claim 13, wherein additional advanced treatment is carried out on the nitrified effluent in said advanced treatment zone.

15. The process of claim 14 wherein said additional advanced treatment is carried out simultaneously with the de-nitrification of the nitrified effluent.

16. The process of claim 14 wherein said additional advanced treatment is carried out sequentially with the de-nitrification of the nitrified effluent.

* * * * *